Figure 1:
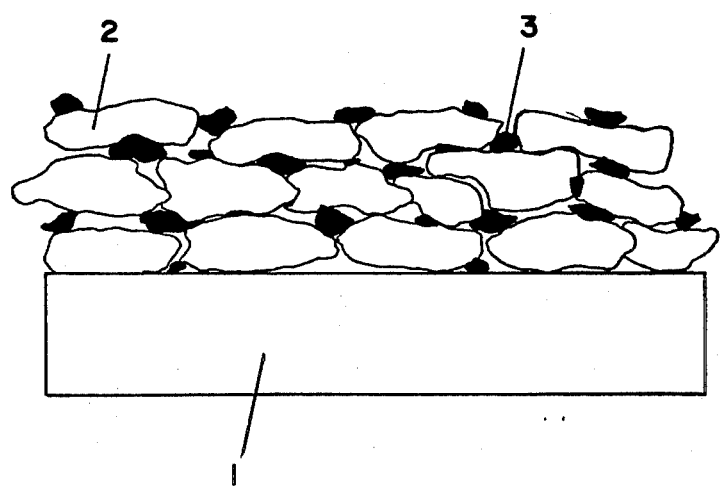

United States Patent [19]

Fabian et al.

[11] 4,392,927

[45] Jul. 12, 1983

[54] NOVEL ELECTRODE

[75] Inventors: Peter Fabian, Freigericht, Fed. Rep. of Germany; Theo Muller, Wuustwezel, Belgium

[73] Assignee: Heraeus Elektroden GmbH, Fed. Rep. of Germany

[21] Appl. No.: 349,839

[22] Filed: Feb. 18, 1982

[30] Foreign Application Priority Data

Feb. 21, 1981 [DE] Fed. Rep. of Germany ....... 3106587

[51] Int. Cl.$^3$ .................. C25B 1/34; C25B 11/04; C25B 11/08; C25B 11/10
[52] U.S. Cl. .................................... 204/98; 204/128; 204/129; 204/290 R; 204/290 F; 204/291; 204/292; 204/293; 204/294; 204/252; 427/442; 427/423
[58] Field of Search ............... 427/256, 327, 422, 423; 204/290 R, 290 F, 291-294, 98, 128, 129, 242, 252

[56] References Cited

U.S. PATENT DOCUMENTS

| 4,049,841 | 9/1977 | Coker et al. | 204/290 R |
| 4,230,748 | 10/1980 | Patel | 427/423 |
| 4,248,679 | 2/1981 | Welch et al. | 204/290 R |
| 4,263,353 | 4/1981 | Patel | 427/423 |

Primary Examiner—R. L. Andrews
Attorney, Agent, or Firm—Hammond & Littell, Weissenberger and Muserlian

[57] ABSTRACT

A composite electrode comprising an electroconductive base with an electrolyte inert, electroconductive electrocatalytic layer applied by thermal spraying, the said layer being a powder of a matrix material selected from the group consisting of oxides, nitrides, phosphides, silicides, borides and carbides of a metal selected from the group consisting of boron, valve metals and iron group metals having uniformly deposited thereon electrocatalytically active particles of a metal selected from the group consisting of platinum group metals and iron group metals and oxides thereof with a particle size smaller by at least one order of magnitude of the matrix particles and electrolytic cells containing the same and electrolytic processes using the same.

32 Claims, 1 Drawing Figure

NOVEL ELECTRODE

STATE OF THE ART

German patent application Nos. 1,671,422 and 2,300,422 relate to dimensionally stable electrodes prepared by thermal spraying with subsequent application of the electrocatalytic agent but thermal spraying by flame spraying and plasma jet application produces a layer of more or less porosity. If the porosity of the layer is too low, the desired electrochemical reaction with the electrode can only take place on the surface of the electrode layer. If the porosity of the layer is greater, the electrocatalytic agent subsequently applied to the layer will penetrate the layer more deeply in the direction of the electrode base but with decreasing concentration.

If the outer layer is too porous, the electrode base is exposed to the cell conditions and the base is not adequately protected under operating conditions in the cell from the effect of the electrolysis products. Even if the thermally sprayed layer had an ideal density and porosity, the electrocatalytic agent subsequently applied is predominantly only on the external surface of the layer and becomes rapidly eroded whereby the electrode becomes passivated. Moreover, the prior art has the disadvantage of requiring the thermal spraying and activation to be carried out in two separate steps.

OBJECTS OF THE INVENTION

It is an object of the invention to provide novel electrodes having prolonged operating characteristics and a method of preparing the said electrodes.

It is another object of the invention to provide a novel electrolysis cell containing at least one electrode of the invention as its anode and/or cathode.

It is a further object of the invention to provide a novel method of electrolysis of an aqueous electrolyte.

These and other objects and advantages of the invention will become obvious from the following detailed description.

THE INVENTION

The novel composite electrodes of the invention are comprised of an electroconductive base with an electrolyte inert, electroconductive electrocatalytic layer applied by thermal spraying, the said layer being a powder of a matrix material selected from the group consisting of oxides, nitrides, phosphides, silicides, borides and carbides of a metal selected from the group consisting of boron, valve metals and iron group metals having uniformly deposited thereon electrocatalytically active particles of a metal selected from the group consisting of platinum group metals and iron group metals and oxides thereof with a particle size smaller by at least one order of magnitude of the matrix particles.

The homogeneous distribution of the smaller electrocatalytic particles over the much larger matrix particles results in the two layer components being superifically bonded together and the resulting powder for thermal spraying has the advantages of being able to apply the active layer in a single operation. Moreover, the resulting layer has the electrocatalytic agent distributed uniformly throughout the layer offering a very large active surface area and mechanical abrasion of the layer does not lead to rapid passivation as the new surface contains additional electrocatalytic agent resulting in a new active surface.

The layer is preferably 50 to 110 microns, more preferably 80 to 110 microns thick. If the layer is too thin, the electrode base may not be adequately coated resulting in an electrode with a short operating life and the layer will not have sufficient mechanical strength, especially resistance to abrasion. If the layer of the electrode is too thick, the electrode becomes too expensive.

The metals used to form the powdered matrix may be boron, iron group metals such as iron, cobalt and nickel and valve metals such as titanium, tantalum, vanadium, zirconium, zirconium and niobium and alloys thereof in the form of their oxides, nitrides, phosphides, borides, silicides and carbides.

A preferred anode matrix for the electrolysis of alkali metal halide electrolyte, especially sodium chloride to produce chlorine, is titanium oxide since it is a commerically available product with broad uses such as sintering although tantalum oxide is also useful.

A preferred matrix when the electrode is to be used as a cathode in the electrolysis of alkali metal chloride electrolytes is the metals of the iron group such as nickel oxide, nickel carbide, cobalt oxide or cobalt carbide and the electrocatalytic agent with a particle size smaller by at least one magnitude is uniformly applied to the matrix. The resulting powder is then preferably applied to a cathode base material such as steel or similar materials by thermal spraying. Also useful cathodes is magnetite or other iron oxides coated with a platinum group metal.

The electocatalytic agent may be a platinum group metal such as platinum, palladium, ruthenium, rhodium, osmium or iridium or an iron group metal such as iron, cobalt or nickel and oxides thereof. The said agent is in the form of particles at least one order of magnitude less than the matrix particles and preferably 20 to 50 times smaller.

The amount of said agent for economical reasons should be kept as low as possible but should be sufficient not to impair the desired properties of the electrode. Preferably, the coating contains 1 to 5%, most preferably 1 to 3%, by weight of the powder layer on the electrode.

The thermally applied layer may also contain a third agent to provide desirable properties to the layer such as mechanical strength to provide resistant to abrasion at the layer surface. For these purposes, the layer may contain 5 to 50% by weight of the layer of mechanically resistant materials such as ceramic, vitreous or glass like materials such as glass ceramic components.

To reduce the amount of costly platinum group metals to a minimum, the electrocatalytic agent on the matrix is distributed in such a ternary layer so that the amount of electrocatalytic particles increases from the interior to the exterior of the layer. An example of a suitable gradient is illustrated in the following Table with the layer surface on the electroconductive base containing no electrocatalytic agent and the outer surface containing no ternary agent of titanium doxide.

TABLE I

|  | % TiO$_2$ + Pt | % TiO$_2$ |
| --- | --- | --- |
| Interior |  |  |
| Surface on base | 0 | 100 |
|  | 20 | 80 |
|  | 40 | 60 |
|  | 60 | 40 |
|  | 80 | 20 |

TABLE I-continued

| | % TiO₂ + Pt | % TiO₂ |
|---|---|---|
| Exterior surface | 100 | 100 |

A concentration gradient of the type in Table I can be easily predetermined with the use of known proportionating equipment for the independent feeding of two components to a thermal spraying apparatus. If desired, the concentration gradient may be uniform or varied to other ratios.

In a preferred process of the invention for the preparation of the powder used to form the electrode layer, a soluble salt of the electrocatalytic agent is dissolved in a low-boiling point solvent and the powdered matrix is placed in the solution and the mixture is stirred at 50° to 10° C. below the boiling point of the solvent after which the solvent is evaporated. When the powder is almost dry, it is dried in an oven at a temperature 10° to 40° C. higher than the solvent boiling point for one to 4 hours. The powder is then ground to crush any agglomerates that may have formed while being careful not to change the original grain size and the powder is then heated at temperatures sufficiently high to thermally decompose the salt and form the electrocatalytic agent. The thermal decomposition may be effected in an oxidizing atmosphere or an inert atmosphere.

For commerical scale, the deposition of the electrocatalytic agent on the matrix particles may be effected in a fluidized bed with the salt solution being sprayed on a fluidized bed of the matrix particles with a counterflow mist. The particles to form the layer have the matrix particles coated as uniformly as possible with the electrocatalytic agent but not necessary with a dense coating. The particles of the electrocatalytic agent are to be regularly distributed on the surface of the matrix particles.

The electroconductive base may be made of any suitable material in any desired form. The base may be made of graphite, valve metals such as titanium or tantalum or steel or other iron alloys depending on whether the electrode is to be used as an anode or a cathode. The base may be in the form of a sheet, mesh, rods, etc.

The electrolytic cell of the invention is comprised of a housing containing an anode and a cathode forming an interelectrodic gap optionally with a membrane or diaphragm therein, at least one of the said anode or cathode being an electrode of the invention as discussed above.

The novel electrolysis process of the invention comprises passing an electrolysis current between an anode and a cathode with an aqueous electrolyte therebetween, at least one of said anode and cathode being an electrode of the invention as discussed above. The aqueous electrolyte preferably is an alkali metal chloride solution or sulfuric acid electrolyte.

Referring now to the drawing:

The FIGURE is a partial schematic illustration of an electrode of the invention with an electrically conductive base 1 on which a layer of composite powder has been thermally sprayed. The larger matrix particles 2 have superficially and homogeneously deposited thereon electrocatalytic particles 3 which are smaller by an order of magnitude, preferably 20 to 50 times smaller.

In the following example there are described several preferred embodiments to illustrate the invention. However, it should be understood that the invention is not intended to be limited to the specific embodiments.

EXAMPLE 1

100 g of non-stoichiometric titanium oxide powder with a grain size of −100 +37 microns were placed in an evaporating dish and a solution of 2.5 g of hexachloroplatinate in 120 ml of methanol was added thereto. The methanol was evaporated while stirring the mixture over a water bath and when the mixture was almost completely dry, the evaporating dish was placed in a drying oven at 105° C. for 2 hours. The resulting powder was then lightly crushed with a mortar to reduce any agglomerates to the original grain size and the powder was then heated at 550° C. for 4 hours in a crucible in a muffle. The cooled powder was again lightly ground to its original size and the powder was screened for a grain size of −100 −37 microns.

A titanium sheet measuring 30 mm × 120 mm × 2 mm was sandblasted with normal corundum containing 3% titanium oxide and the sheet was coated with the above obtained powder using a plasma burner model F-4 of Plasmatechnik Company. The plasma operating conditions were a current of 400 A, a voltage of 70 V and a plasma gas consisting of 26 liters of nitrogen per minute and 2 liters of hydrogen per minute. The spraying distance was 150 mm and the resulting layer on the titanium sheet was 100 mm.

Electrodes as produced above were used as the cathode and anode in a laboratory cell with an electrode gap of 6.5 cm and a current density of 100 A/m² for electrolysis of 10% sulfuric acid at 20° C. After one month of operation, the cell potential of 2.56 volts was unchanged.

Various modifications of the electrodes and cells and electrolysis process of the invention may be made without departing from the spirit or scope thereof and it is to be understood that the invention is intended to be limited only as defined in the appended claims.

What we claim is:

1. A composite electrode comprising an electroconductive base with an electrolyte inert, electroconductive electrocatalytic layer applied by thermal spraying, the said layer being a powder of a matrix material selected from the group consisting of oxides, nitrides, phosphides, silicides, borides and carbides of a metal selected from the group consisting of boron, valve metals and iron group metals having uniformly admixed therewith electrocatalytically active particles of a different metal selected from the group consisting of platinum group metals and iron group metals and oxides thereof with a particle size smaller by at least one order of magnitude of the matrix particles.

2. An electrode of claim 1 wherein the electroconductive base is selected from the group consisting of graphite, metals and alloys thereof.

3. An electrode of claim 1 or 2 wherein matrix particles are selected from the group consisting of valve metal oxides and carbides and the electrocatalytic particles are 1 to 5% by weight of the layer.

4. An electrode of claim 3 wherein the valve metal is titanium.

5. An electrode of claim 3 wherein the matrix particles are a substoichiometric oxide and the platinum metal particles are 1 to 3% by weight of the layer.

6. An electrode of claim 5 wherein the matrix particles are 20 to 50 times larger than the platinum group particles.

7. An electrode of claim 1 or 2 wherein the matrix particles are iron oxide particles and the electrocatalytic particles are platinum metal particles.

8. An electrode of claim 7 wherein the matrix particles are magnetite particles.

9. An electrode of claim 1 wherein the layer contains 5 to 50% by weight of the layer of mechanically resistant particles.

10. An electrode of claim 9 wherein the electrocatalytically active particles on the matrix particles are distributed in the layer so that the amount of electrocatalytic agent increases from the interior of the layer to the exterior of the layer.

11. In an electrolytic cell comprising a housing with an anode and a cathode forming an inter electrodic gap optionally having a membrane or diaphragm therein, the improvement comprising at least the anode or cathode being an electrode of claim 1.

12. The cell of claim 11 wherein the electroconductive base is selected from the group consisting of graphite, metals and alloys thereof.

13. The cell of claim 11 wherein matrix particles are selected from the group consisting of valve metal oxides and carbides and the electrocatalytic particles are 1 to 5% by weight of the layer.

14. The cell of claim 11 wherein the valve metal is titanium.

15. The cell of claim 11 wherein the matrix particles are substoichiometric titanium oxide and the platinum metal particles are 1 to 3% by weight of the layer.

16. The stable of claim 11 wherein the matrix particles are 20 to 50 times larger than the platinum group particles.

17. The cell of claim 11 wherein the matrix particles are iron oxide particles and the electrocatalytic particles are platinum metal particles.

18. The cell of claim 11 wherein the matrix particles are magnetite particles.

19. The cell of claim 11 wherein the layer contains 5 to 50% by weight of the layer of mechanically resistant particles.

20. The cell of claim 11 wherein the electrocatalytically active particles on the matrix particles are distributed in the layer so that the amount of electrocatalytic agent increases from the interior of the layer to the exterior of the layer.

21. In the process of electrolyzing an aqueous electrolyte containing chloride ions or sulfate ions by impressing an electrolysis current on an anode and a cathode with the electrolyte between them the improvement comprising at least one of the anode or cathode being an electrode of claim 1.

22. The method of claim 21 wherein the electroconductive base is selected from the group consisting of graphite, metals and alloys thereof.

23. The method of claim 21 wherein matrix particles are selected from the group consisting of valve metal oxides and carbides and the electrocatalytic particles are 1 to 5% by weight of the layer.

24. The method of claim 21 wherein the valve metal is titanium.

25. The method of claim 21 wherein the matrix particles are substoichiometric titanium oxide and the platinum metal particles are 1 to 3% by weight of the layer.

26. The method of claim 21 wherein the matrix particles are 20 to 50 times larger than the platinum group particles.

27. The method of claim 21 wherein the matrix particles are iron oxide particles and the electrocatalytic particles are platinum metal particles.

28. The method of claim 21 wherein the matrix particles are magnetite particles.

29. The method of claim 21 wherein the layer contains 5 to 50% by weight of the layer of mechanically resistant particles.

30. The method of claim 21 wherein the electrocatalytically active particles on the matrix particles are distributed in the layer so that the amount of electrocatalytic agent increases from the interior of the layer to the exterior of the layer.

31. An electrode of claim 1 wherein the matrix particles are selected from the group consisting of iron metal group oxides and carbides and the electrocatalytic particles are platinum group metal particles and the base is made of an iron group metal or alloy.

32. An electrode of claim 31 wherein the matrix particles are selected from the group consisting of nickel oxide, nickel carbide, cobalt oxide and cobalt carbide and the base is made of steel.

* * * * *